W. TAYLOR.
EGG BEATER.
APPLICATION FILED NOV. 12, 1915.

1,197,565.

Patented Sept. 5, 1916.

Inventor
William Taylor
By Victor J. Evans
Attorney

Witness
M. H. Slifer

UNITED STATES PATENT OFFICE.

WILLIAM TAYLOR, OF CANONBURY, LONDON, ENGLAND, ASSIGNOR TO SHAW AND COMPANY, OF LONDON, ENGLAND, A FIRM.

EGG-BEATER.

1,197,565.  Specification of Letters Patent.  Patented Sept. 5, 1916.

Application filed November 12, 1915. Serial No. 61,133.

*To all whom it may concern:*

Be it known that I, WILLIAM TAYLOR, a subject of the King of Great Britain, residing at 85 Marquess road, Canonbury, London, N., England, have invented new and useful Improvements in Egg-Beaters, of which the following is a specification.

The present invention relates to improvements in beaters or whisks for eggs, cream, batter and such like substance and resides in the construction, combination and arrangement of parts set forth in the following specification and falling within the scope of the appended claim.

Figure 1:
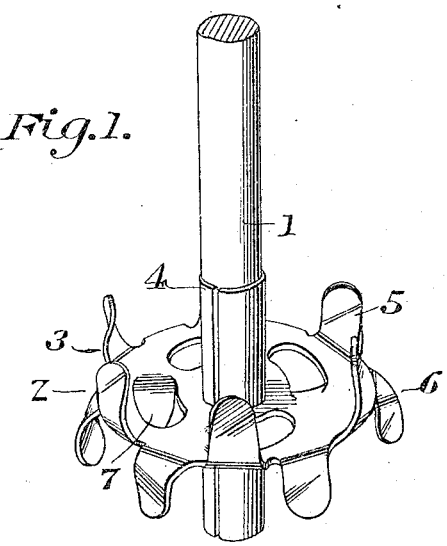
Figure 2:
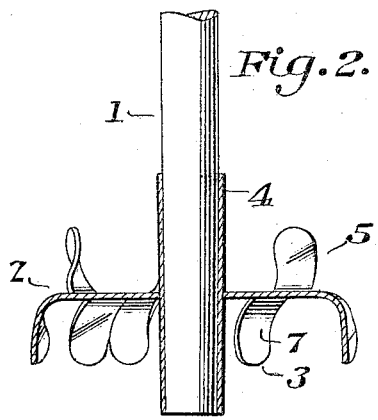
Figure 3:
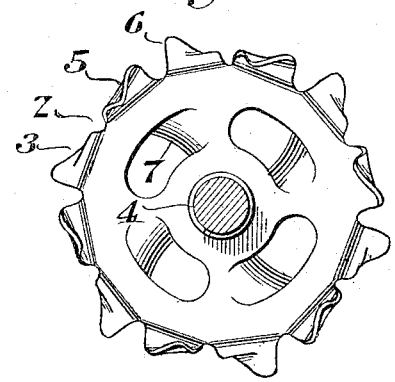

In the drawings: Figure 1 is a perspective view of a whisk or beater constructed in accordance with the present invention, Fig. 2 is a vertical transverse sectional view through the same, Fig. 3 is a top plan view of the same.

Referring now to the drawings in detail, the numeral 1 designates the handle of my device, and 2 the whisk which is attached to the handle. The whisk 2 includes a body 3 and a split sleeve 4 which extends centrally through the body. The handle 1 is provided with a tapered end and this end is inserted in the split sleeve 4 causing the said sleeve to tightly contact with the said end of the handle. The body is preferably constructed from a single sheet of suitable material and is annular in plan, and the periphery of the said body is slitted for a suitable distance radially from its center and the portions provided between the slits being bent in opposite directions from the body 3, so that certain of said portions will extend upwardly from the body, as indicated by the numeral 5 and certain other portions, between the first mentioned portions, are bent downwardly, as indicated by the numeral 6. The portions 5 and 6 provide, what I term, ears, and the said ears are curved in opposite directions from their adjacent or mating edges, as clearly illustrated in the drawings and as is shown particularly in Figs. 2 and 3 thereof. The body interiorly of the tongues and exteriorly of the sleeve 4 is formed with annular substantially U-shaped depressions and the metal between the said depressions is bent downwardly providing fingers 7, and the said fingers are round or curved in side elevation at, what may be termed, a right angle with respect to the tongues 5 and 6. The lower portion of the sleeve is disposed a suitable distance below the tongues and also below the fingers 7, so that this portion of the sleeve serves as a fulcrum member whereby the handle 1 may be rotated and also the said handle may be moved in a vertical or reciprocatory direction as desired.

It will thus be noted that I have provided a whisk which is of an extremely simple construction, which may be readily manufactured, which may receive a rotatable as well as an oscillatory movement in separating the particles or elements constituting the body of the egg or cream upon which it acts.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

An egg whisk or analogous device including a split sleeve having a tapered handle therein, a flat body having a central opening receiving the sleeve and being arranged approximately central on the sleeve, said body having an annular periphery and being slitted radially from its periphery, and the portions of the slits being bent at opposite angles from the body providing the said body with peripheral ears, and the said ears being curved upon themselves in opposite directions from their meeting ends, and the said body being further provided with angularly disposed fingers which extend through openings in the body.

In testimony whereof I affix my signature in presence of two witnesses.

WILLIAM TAYLOR.

Witnesses:
 GEORGE SHAW,
 R. H. HEIR.

Copies of this patent may be obtained for five cents each, by addressing the "Commissioner of Patents, Washington, D. C."